United States Patent [19]

Su

[11] Patent Number: 5,167,887

[45] Date of Patent: Dec. 1, 1992

[54] $SI_3N_4$ PROCESS USING POLYSILANE AS A BINDER

[75] Inventor: Sophia R. Su, Weston, Mass.

[73] Assignee: GTE Laboratories Incorporated, Waltham, Mass.

[21] Appl. No.: 823,006

[22] Filed: Jan. 15, 1992

Related U.S. Application Data

[63] Continuation of Ser. No. 657,601, Feb. 12, 1991, abandoned, which is a continuation of Ser. No. 494,891, Mar. 12, 1990, abandoned, which is a continuation of Ser. No. 92,270, Aug. 31, 1987, abandoned.

[51] Int. Cl.[5] ............................................. C04B 33/32
[52] U.S. Cl. ..................................... 264/63; 264/86; 264/87; 264/344; 501/97
[58] Field of Search ................... 264/63, 86, 87, 344; 501/97

[56] References Cited

U.S. PATENT DOCUMENTS

| | | | |
|---|---|---|---|
| 4,164,528 | 8/1979 | Yajima et al. | 264/63 |
| 4,172,108 | 10/1979 | Maeda | 264/65 |
| 4,582,696 | 4/1986 | Crosbie | 423/344 |
| 4,657,991 | 4/1987 | Takamizawa | 525/477 |
| 4,666,872 | 5/1987 | Baney et al. | 501/88 |
| 4,668,642 | 5/1987 | Bujalski | 501/88 |
| 4,704,242 | 11/1987 | Bandyopadhyay | 264/63 |

FOREIGN PATENT DOCUMENTS

| | | |
|---|---|---|
| 3605126A1 | 8/1986 | Fed. Rep. of Germany . |
| 2-5575968A | 6/1990 | Japan . |
| WO80/0021A1 | 1/1980 | PCT Int'l Appl. . |

OTHER PUBLICATIONS

B. C. Mutsuddy, Use of Organometallic Polymer for Making Ceramic Parts by Plastic Forming Techniques, Cer. Intl. 13 (1987) 41–53.

K. B. Schwartz, D. J. Rowcliffe, and Y. D. Blum, Microstructural Development in $Si_3N_4$/Polysilazane Bodies During Heating.

*Primary Examiner*—James Derrington
*Attorney, Agent, or Firm*—Frances P. Craig; Carl F. Ruoff; Ivan L. Ericson

[57] ABSTRACT

A method of making fully dense, crack-free silicon nitride articles using polysilanes as a binder. Polysilane is dissolved in a solvent and a silicon nitride composition including a densification aid is added to form a homogeneous mixture. The mixture is dried to form a powder, and molded at a temperature less than 100° C. to form a molded article. Alternatively, the slurry is poured into a mold and vacuum filtered to form a cake, then isostatically pressed at a temperature of approximately 90° C. The molded article or pressed cake is heated at a rate of approximately 5° C./min to about 900° C. in a nonoxidizing atmosphere and held at about 900° C. for a time sufficient to decompose the polysilane. The article is sintered in a nonoxidizing atmosphere at a temperature of about 1685°–1900° C. to form a silicon nitride article free of cracks and having a density greater than 3.5 g/cc.

8 Claims, No Drawings

SI₃N₄ PROCESS USING POLYSILANE AS A BINDER

This is a continuation of copending application Ser. No. 07/675,601 filed on Feb. 12, 1991, now abandoned, which is a continuation of application Ser. No. 07/494,891 filed on Mar. 12, 1990 and now abandoned, which is a continuation of application Ser. No. 07/092,270 filed on Aug. 31, 1987 and now abandoned.

FIELD OF THE INVENTION

This invention relates to a method for making silicon nitride articles.

More particularly, this invention relates to a method for making silicon nitride articles using polysilane, or polysilazane as a binder.

BACKGROUND OF THE INVENTION

In recent years, the search for cost-effective production of complex ceramic shapes used at elevated temperatures has stimulated the research and development of metal organic polymer precursors. Fine ceramics made from metal organic precursors have several advantages over the ceramics produced by the conventional processing. For example, low temperature forming processes can be used to produce complex shape by a variety of forming techniques. A wide range of purities can be achieved through careful balance of chemical stoichiometry. The opportunity to chemically purify starting materials and assure homogeneous mixing can improve the uniformity and reliability of the final product.

Strength-limiting factors in high-performance technical ceramics are not always directly related to composition. As the desired shapes get more complicated, it becomes more and more difficult to fabricate parts reliably and free of cracks. One of the problems encountered frequently in fabricating ceramic parts is the binder used in injection molding process. The binder's physical properties must satisfy stringent requirements to allow complete filling of complicated shaped molds without forming density gradients, and the binder must be completely removed prior to sintering without causing physical defects. Organic hydrocarbon-polymers are currently used for this purpose. However, there are problems such as low powder packing densities and the length of time necessary to remove the binders. In addition, the molded articles have a poor green strength after binder removal. As a result, there is excessive shrinkage when the molded article is sintered which makes it difficult to maintain the dimensional precision of the molded article after sintering. Therefore, the exploration of novel binder materials is needed to alleviate these problems.

SUMMARY OF THE INVENTION

In accordance with one aspect of the present invention, a new and improved method for making silicon nitride articles involves dissolving polysilane in a solvent and adding a silicon nitride composition to form a homogeneous mixture. The silicon nitride composition includes silicon nitride and one or more densification aids selected from aluminum oxide and yttrium oxide. The solvent is removed from the mixture by evaporation to form a powder. The powder is molded at a temperature less than 100° C. to form a molded article. The molded article is heated at a rate of approximately 5° C./min to a temperature of about 900° C. in a nonoxidizing atmosphere and the temperature is held at about 900° C. for a time sufficient to decompose the polysilane. The molded article is then sintered in a nonoxiding atmosphere at a temperature of about 1685° C. to about 1900° C. to form a densified silicon nitride article free of internal cracks and having a density greater than 3.05 g/cc.

In accordance with another aspect of the invention, a new and improved method for making silicon nitride articles by slip isostatic pressing involves dissolving polysilane in a solvent and adding a silicon nitride composition to form a homogeneous mixture. The silicon nitride composition includes silicon nitride and one or more densification aids selected from aluminum oxide and yttrium oxide. The mixture is poured into a mold and the solvent is removed from the mixture by vacuum filtering to form a cake. The cake is isostatically pressed at a temperature of approximately 90° C. The pressed cake is heated at a rate of approximately 5° C./min to a temperature of about 900° C. in a nonoxidizing atmosphere and the temperature is held at about 900° C. for a time sufficient to decompose the polysilane. The pressed cake is then sintered in a nonoxidizing atmosphere at a temperature of about 1685° C. to about 1900° C. to form a densified silicon nitride article free of internal cracks and having a density greater than 3.05 g/cc.

DETAILED DESCRIPTION OF THE PREFERRED EMBODIMENTS

This invention utilizes polysilane, or polysilazane as a binder for the processing of $Si_3N_4$ based composites, such as PY6 and AY6 materials. The PY6 composition comprises about 6 weight percent $Y_2O_3$ as a densification aid and $Si_3N_4$ which contains 1-4 weight percent $SiO_2$ preferably 3 weight percent $SiO_2$. The AY6 composition comprises about 2 weight percent $Al_2O_3$, about 6 weight percent $Y2O_3$, both densification aids, and $Si_3N_4$ which contains about 1-4 weight percent $SiO_2$ preferably 3 weight percent $SiO_2$.

The specific binders selected were MIT's thermal plastic polysilazane, and Union Carbide's thermoset vinylic polysilane, both having good flow properties and high ceramics yield upon pyrolysis. As illustrated in Tables I, II and III, silicon nitride based composite mixture was formulated at three different binder concentrations using polysilane or polysilazane.

The first mixture contained about 10 weight percent binder and about 90 weight percent AY6, the second contained about 25 weight percent binder and about 75 weight percent AY6, and the third contained 40 weight percent binder and 60 weight percent AY6. The mixture was blended either by dry blending or dispersing by sonicating a solution containing the binder, AY6, and toluene forming a slurry suspension. The slurry was dried to form a powder. The resulting powders were then sifted through a 200 mesh screen prior to pressing at 6,000 psi in a die press (1″ diameter disc or ½″ diameter pellets). The binder removal (burn out) was carried out in nitrogen, a non-oxidizing atmosphere. The composite pellets and discs were embedded in a setter powder made of the same material as the initial AY6 powder. The resulting pellets and discs of the composites using polysilane as a binder were heated at a rate of 3° C./min to 700° C., held for 1½ hrs, and then cooled at a rate of 10° C./min to room temperature. A slightly different schedule was applied to the composites using polysilazane as the binder. They were heated at a rate of 5° C./min to 900° C., held for 3 hrs, and cooled at a rate of 5° C./min to room temperature. The volatile decomposition products from the pyrolysis step diffused out of the composite without causing internal cracking as noted by microfocus x-ray imaging analysis and scanning electron microscopy.

EXAMPLE 1

2.72 grams of polysilane were added to 32 ml of toluene and stirred until dissolved. 7.49 grams of AY6 powder (silicon nitride containing alumina and yttria sintering aids) was dispersed in the toluene mixture with a sonicator for 10 minutes. The toluene solvent was evaporated by heating in a nitrogen stream. The resulting powder was sifted through 150 mesh screen and pressed into 1 gram pellets utilizing a 6000 lb. per square inch pressure which was applied twice to form the pellet. The resulting pellet was then heated to 900° C. at a rate of 5° C. per minute and held for 1 hour forming an amorphous silicon nitride and silicon carbide. Then it was sintered at 1850° C. at 200 psi nitrogen pressure for 3 hours to form a densified silicon nitride pellet.

EXAMPLE 2

1.08 grams of polysilazane were dissolved in 30 ml of toluene and dispersed with 9 grams of AY6 (silicon nitride having alumina and yttria as sintering aids) and 0.5 grams (5 wt %) oleic acid. The mixture was sonicated for 10 minutes. The powder was dried with stirring and sieved through a 100 mesh screen. The sieved powder was then pressed into a 4 gram disc using 6000 lbs. per square inch pressure. The disc was then heated in a nitrogen atmosphere to a temperature of 900° C. at a rate of 5° C. per minute and held at temperature for 1 hour then cooled. This was then sintered at 1750° C. for 3 hours in a nitrogen atmosphere forming a densified silicon nitride disc having a density of 3.098 grams per cubic centimeter.

EXAMPLE 3

Slip-Isostatically Pressed Billets were prepared by dispersing 85 grams of a AY6 powder in 100 ml of a toluene solution containing 15 grams of polysilane. The mixture was sonicated for 10 minutes to form a slurry. The slurry was then dried in air. The dried powder (20-25 grams) was added to 9 to 14 ml of isopropanol to make a slip. The slip was sonicated and poured into the cavity of a rubber mold (1½"×1½"×½") and vacuum filtered on a porous bronze filter to form a filter cake. The cake was then isostatically pressed at 23,000 psi for 2 minutes forming a pressed billet. The pressed billet was dried in a dissicator for 12 hours prior to burnout.

The binder in the billet was burned out by heating in a nitrogen non-oxidizing atmosphere at a rate of 1.0 to 2.5° C./min to 900° C., and held at 900° C. for 5 hours then cool down to room temperature at a rate of 2.5° C./min. The billet was then sintered at 1850° C. in a 200 psi nitrogen atmosphere (overpressure) for 4 hours.

EXAMPLE 4

Billets were also prepared by dispersing 39 grams of a AY6 powder into a 30 ml of toluene solution containing 6.5 grams of polycarbosilane by sonicating the dispersion to form a slurry. The slurry was then poured into the cavity of a rubber mold (1½"×1½"×½) and vacuum filtered on a porous bronze filter to form a filter cake. The cake was either isostatically pressed or set for 2 hrs at 90° C. prior to the removal from the mold. The billet was then sintered at 1850° C. in a 200 psi (overpressure) nitrogen atmosphere (non-oxidizing atmosphere) for 4 hours.

Two slip-isostatically pressed billets containing 25 wt % polysilazane and 75 wt % AY6 powders were found to remain intact after the binder burnout cycle and were sintered to 3.1 to 3.2 g/cc nominal density at 1850° C. 200 psi $N_2$ overpressure. The similar results were obtained from billets containing 25 wt % polysilane and 75 wt % AY6 as illustrated in Table IV of the sintering results. Slip-cast billets prepared from the same compositions were also sintered to high density composites at 1850° C., 200 psi $N_2$ overpressure. The mechanical strength of these sintered, fully dense composites has been determined by 4 point MOR testing from 25° C. to 1400° C. The oxidation rate at 1000° C. was also determined after 600 hr. exposure. The results are comparable to those of the conventional AY6.

The mechanical strength and oxidation resistance properties, oxidation rate constant, obtained after 600 hrs at 1000° C. of samples 28–35, are illustrated in Table V. The sintering results are summarized in Table IV.

This invention provides a method for improving the uniformity and reliability of the final product. The green strength is improved and the amount of shrinkage upon sintering is reduced improving the dimensional precision of the molded article after sintering. In addition, the sintered article is free of internal cracking which is a serious problem with other methods.

While there has been shown and described what is at present considered the preferred embodiment of the invention, it will be obvious to those skilled in the art that various changes and modifications may be made therein without departing from the scope of the invention as defined by the appended claims.

TABLE I

| Sample No. | Composition | Shape-Forming Technique | Density g/cc After Binder Burnout | Sintering Conditions |
| --- | --- | --- | --- | --- |
| 1 | 40 wt % polysilane 60 wt % AY6 | Die Pressed-6,000 psi ½" pellets | 1.61 | 1850° C. - 60 psi $N_2$ overpressure |
| 2 | Same | Same | 1.65 | 1900° C. - 200 psi $N_2$ overpressure |
| 3 | 25 wt % polysilane 75 wt % AY6 | Same | 1.59 | 1750° C. - 60 psi $N_2$ overpressure |
| 4 | Same | Die Pressed-6,000 psi, 1" Disc | 1.36 | 1850° C. - 60 psi $N_2$ overpressure |
| 5 | 25 wt % polysilane 75 wt % AY6 + 5 wt % oleic acid based on AY6 | Same | 1.55 | 1750° C. - 60 psi $N_2$ overpressure |
| 6 | Same | Die Pressed- | 1.62 | 1850° C. 3 hrs. |

TABLE I-continued

| Sample No. | Composition | Shape-Forming Technique | Density g/cc After Binder Burnout | Sintering Conditions |
|---|---|---|---|---|
| | | 6,000 psi ½" pellets | | 60 psi N$_2$ overpressure |
| 7 | 10 wt % polysilane 90 wt % AY6 | Same | 1.92 | 1850° C. - 75 psi N$_2$ overpressure |
| 8 | Same | Same | 1.98 | 1700° C. - 12 psi N$_2$ overpressure |
| 9 | Same | Same | 1.98 | 1900° C. - 200 psi N$_2$ overpressure |
| 10 | Same | Same | 1.93 | 1700° C. - 12 psi N$_2$ overpressure |

TABLE II

| Sample No. | Composition | Shape-Forming Technique | Density g/cc After Binder Burnout | Sintering Conditions |
|---|---|---|---|---|
| 11 | 40 wt polysilazane 60 wt % AY6 | Die Pressed- 6,000 psi ½" pellets | 1.87 | 1850° C. - 60 psi N$_2$ overpressure |
| 12 | Same | Same | 1.94 | 1850° C. - 70 psi N$_2$ overpressure |
| 13 | Same | Same | 1.90 | 1685° C. - 8 psi N$_2$ overpressure |
| 14 | 25 wt % polysilazane 75 wt % AY6 | Die Pressed- 6,000 psi, 1" Disc | 2.23 | 1850° C., 3 hrs. 60 psi N$_2$ overpressure |
| 15 | Same | Same | 2.25 | 1850° C. - 60 psi N$_2$ overpressure |
| 16 | 25 wt % polysilazane 75 wt % AY6 + 5 wt % oleic acid based on AY6 powders | Same | 2.16 | 1850° C., 60 psi N$_2$ overpressure |
| 17 | Same | Same | 2.19 | 1850° C. - 60 psi N$_2$ overpressure |
| 18 | 10 wt % polysilazane 90 wt % AY6 | Same | 2.18 | 1750° C. - 60 psi N$_2$ overpressure |
| 19 | Same | Same | 2.17 | 1850° C. - 60 psi N$_2$ overpressure |
| 20 | 10 wt % polysilazane 90 wt % AY6 + 5 wt % oleic acid based on AY6 powder | Same | 2.12 | 1750° C. - 60 psi N$_2$ overpressure |

TABLE III

| Sample No. | Composition | Shape-Forming Technique | Density g/cc After Binder Burnout | Sintering Conditions |
|---|---|---|---|---|
| 21 | 20 wt % polysilazane 80 wt % AY6 | Isostatically Pressed billet | — | 1850° C./50 psi N$_2$ overpressure 4 hrs. |
| 22 | 16 wt % polysilane 84 wt % AY6 | Same | 2.06 | 1850° C./200 psi N$_2$ overpressure 4 hrs. |
| 23 | 20 wt % polysilane 80 wt % AY6 | Same | 1.79 | Same |
| 24 | 25 wt % polysilane 75 wt % AY6 | Same | 1.79 | Same |
| 25 | Same | Same | 1.79 | Same |
| 26 | 10% wt polysilane 90 wt % AY6 | Same | 1.91 | Same |
| 27 | 15 wt % Polysilane 85 wt % AY6 | Same | 1.73 | Same |
| 28 | 15 wt % Polysilane 85% wt % AY6 | Slip-Isostatically Pressed Billet | 1.54 | Same |
| 29 | Same | Same | 1.73 | Same |
| 30 | Same | Same | 1.77 | Same |
| 31 | Same | Same | 1.75 | Same |
| *32 | Same | Same | 1.64 | Same |
| *33 | Same | Same | 1.73 | Same |
| *34 | Same | Same | 1.75 | Same |
| *35 | Same | Same | 1.58 | Same |

*AY6 powders contain: 2.64 wt % Al$_2$O$_3$; 7.68 to 8.47 wt % Y$_2$O$_3$

TABLE IV

| Sample no. | Sintered Density g/cc | XRD Phase Identification |
|---|---|---|
| 1 | 3.12 | beta-$Si_3N_4$ |
| 2 | 3.21 | Major: beta-$Si_3N_4$, Trace: SiC |
| 3 | 3.04 | |
| 4 | 3.11 | Major: beta-$Si_3N_4$ Minor: $Si_3N_4$—$Y_2O_3$—$SiO_2$ |
| 5 | 2.95 | beta-$Si_3N_4$ |
| 6 | 3.05 | Major: beta-$Si_3N_4$ Minor: $Si_3N_4$—4$Y_2O_3$—$SiO_2$ |
| 7 | 3.18 | Major: beta-$Si_3N_4$ Minor: $Si_3N_4$—$SiO_2$—4$Y_2O_3$ Trace: $YNSiO_2$ |
| 8 | 3.11 | Major: beta-$Si_3N_4$ Minor: $YNSiO_2$, $Y_2Si_2O_5$ |
| 9 | 3.15 | Major: beta-$Si_3N_4$ Minor: $Y_2Si_2O_5$, $YNSiO_2$ |
| 10 | 3.03 | Major: beta-$Si_3N_4$ Minor: $Y_2Si_2O_5$, $YNSiO_2$ |
| 11 | 3.02 | Major: beta-$Si_3N_4$ Minor: $Y_2O_3$—$Si_3N_4$ |
| 12 | 2.96 | Major: beta-$Si_3N_4$ Minor: $Y_2O_3$—$Si_3N_4$ |
| 13 | 2.94 | Major: beta-$Si_3N_4$ Minor: $Y_2O_3$—$Si_3N_4$ Trace: alpha-$Si_3N_4$ |
| 14 | 3.14 | Major: beta-$Si_3N_4$ Minor: $Si_3N_4$—$Y_2O_3$ |
| 15 | 3.16 | — |
| 16 | 3.12 | — |
| 17 | 3.16 | Major: beta-$Si_3N_4$ Minor: $Si_3N_4$—$Y_2O_3$ |
| 18 | 3.21 | Major: beta-$Si_3N_4$ Minor: $Si_3N_4$—$Y_2O_3$ |
| 19 | 3.20 | Major: beta-$Si_3N_4$ Minor: $Si_3N_4$—$Y_2O_3$ |
| 20 | 3.10 | beta-$Si_3N_4$ |
| 21 | 3.05 | Major: beta $Si_3N_4$ Minor: $YSi_2ON$ |
| 22 | 3.16 | Major: beta $Si_3N_4$ Minor: 5$Y_2O_3$—$Si_3N_4$—$Al_2O_3$ |
| 23 | 3.24 | Major: beta-$Si_3N_4$ Minor: 5$Y_2O_3$—$Al_2O_3$ |
| 24 | 3.07 | Major: beta $Si_3N_4$ Minor: $Y_2O_3$—$Si_3N_4$ Weak: SiC |
| 25 | 3.03 | Major: beta $Si_3N_4$ Weak: 5$Y_2O_3$—$Si_3N_4$—$Al_2O_3$ |
| 26 | 3.13 | beta-$Si_3N_4$ |
| 27 | 3.10 | Major: beta-$Si_3N_4$ Minor: 5$Y_2O_3$—$Si_3N_4$—$Al_2O_3$, SiC |
| 28 | 3.16 | Major: beta-$Si_3N_4$ Minor: $YSi_2ON$ |
| 29 | 3.25 | — |
| 30 | 3.25 | — |
| 31 | 3.26 | — |
| 32 | 3.36 | — |
| 33 | 3.30 | — |
| 34 | 3.29 | — |
| 35 | 3.28 | beta-$Si_3N_4$ |

TABLE V

MECHANICAL STRENGTH AND OXIDATION RESULTS

| Sample No. | AVERAGE MODULUS OF RUPTURE (KSI) AT | | | | OXIDATION RATE CONSTANT ($Kg^2M^{-4}sec^{-1}$) |
|---|---|---|---|---|---|
| | Room Temp. | 1000° C. | 1200° C. | 1400° C. | |
| 28–31 | 109 | 99.5 | 78.4 | 38 | $2.14 \times 10^{-3}$ to $5.08 \times 10^{-3}$ |
| 32–35 | 110 | 111 | 71 | 28 | $1.20 \times 10^{-3}$ to $3.50 \times 10^{-13}$ |

What is claimed is:

1. A method of making silicon nitride articles, comprising:
   (a) dissolving polysilane in a solvent and adding a silicon nitride composition to form a homogeneous mixture, said silicon nitride composition comprising silicon nitride and at least one densification aid selected from the group consisting of aluminum oxide and yttrium oxide;
   (b) evaporating the solvent from the homogeneous mixture to form a powder;
   (c) molding the powder at a temperature less than 100° C. to form a molded article;
   (d) heating the molded article at a rate of approximately 5° C./min to a temperature of about 900° C. in a nonoxidizing atmosphere and holding the temperature at about 900° C. for a time sufficient to decompose the poloysilane;
   (e) sintering the molded article in a nonoxidizing atmosphere at a temperature of about 1685° C. to about 1900° C. to form a densified silicon nitride article free of internal cracks and having a density greater than 3.05 g/cc.

2. The method according to claim 1 wherein the molding of the powder comprises isostatic pressing at room temperature.

3. The method according to claim 1 wherein said homogeneous mixture comprises from about 10 w/o to about 40 w/o polysilane.

4. The method according to claim 1 wherein the solvent is toluene.

5. A method of making silicon nitride articles by slip isostatic pressing, said method comprising:
   (a) dissolving polysilane in a solvent and adding a silicon nitride composition to form a homogeneous mixture, said silicon nitride composition comprising silicon nitride and at least one densification aid selected from the group consisting of aluminum oxide and yttrium oxide;
   (b) pouring the mixture into a mold and vacuum filtering the mixture to remove the solvent to form a cake;
   (c) isostatically pressing the cake at a temperature of approximately 90° C.
   (d) heating the pressed cake at a rate of approximately 5° C./min to a temperature of about 900° C. in a nonoxidizing atmosphere and holding the temperature at about 900° C. for a time sufficient to decompose the poloysilane;
   (e) sintering the pressed cake in a nonoxidizing atmosphere at a temperature of about 1685° C. to about 1900° C. to form a densified silicon nitride article free of internal cracks and having a density greater than 3.05 g/cc.

6. The method according to claim 5 wherein said homogeneous mixture comprise from about 20 w/o to about 40 w/o polysilane.

7. The method according to claim 5 wherein the solvent is toluene.

8. A method of making silicon nitride articles, comprising:
   (a) dissolving polysilane in a solvent and adding a silicon nitride composition to form a homogeneous mixture, said silicon nitride composition comprising silicon nitride and at least one densification aid selected from the group consisting of aluminum oxide and yttrium oxide;
   (b) evaporating the solvent from the homogeneous mixture to form a powder;
   (c) molding the powder at a temperature less than 100° C. to form a molded article;
   (d) embedding the molded article in a setter powder comprising the silicon nitride composition;
   (e) heating the embedded article at a rate of approximately 5° C./min to a temperature of about 900° C. in a nonoxidizing atmosphere and holding the temperature at about 900° C. for a time sufficient to decompose the poloysilane;
   (f) sintering the heated article in a nonoxidizing atmosphere at a temperature of about 1685° C. to about 1900° C. to form a densified silicon nitride article free of internal cracks and having a density greater than 3.05 g/cc.

* * * * *